Patented Oct. 7, 1941

2,258,130

UNITED STATES PATENT OFFICE 2,258,130

THIOAMMELINE ETHERS OF UNSATURATED ALCOHOLS

Herman A. Bruson, Philadelphia, Pa., assignor to The Resinous Products & Chemical Company, Philadelphia, Pa.

No Drawing. Application March 13, 1940, Serial No. 323,699

3 Claims. (Cl. 260—248)

This invention relates to new thioammeline ethers. More particularly it concerns thioammeline ethers containing a hydrocarbon group of at least three carbon atoms in an open chain in which a double bond occurs between carbon atoms in the β,γ-position with respect to the sulfur atom.

This application is a continuation-in-part of application Serial No. 283,740, filed July 11, 1939.

It is an object of this invention to provide a simple, efficient method for preparing these new ethers. It is another object to make available resin-forming materials which are valuable by themselves or in conjunction with other resin-forming compounds for the preparation of carbamide-aldehyde type resins. It is also an object to provide products which may be used as insecticides. It is a further object to provide compounds which have in addition to the 1,3,5-triazine nucleus another reactive group.

It has been found that thioammeline condenses readily in the presence of an alkaline, acid-binding agent with a halide of a hydrocarbon group having at least three carbon atoms and having a double bond between carbon atoms in the β,γ-position with respect to the halogen atom.

In practicing this invention thioammeline is taken up in water or an organic solvent, such as alcohol, with an inorganic alkaline material, such as sodium or potassium hydroxide, and treated with a reacting proportion of the organic halide. In the case of the compounds having a double bond in the β,γ-position, the reaction between thioammeline and halogen runs smoothly and well. The reaction often begins at room temperature and may be accelerated by heating, particularly under reflux at 70 to 100° C. While higher temperatures and heating under pressure may be used, they are, generally speaking, not of particular advantage in preparing these particular ethers, which are obtained in high yield and in good purity. The products are crystalline and may readily be separated and purified when desired.

Variations in procedure are, of course, allowable. The reagents may be mixed in one step or in several steps and one of the reagents may be gradually added, when so desired. In place of sodium or potassium hydroxide there may be used other alkaline, acid-binding agents, such as soda ash, potassium carbonate, barium hydroxide, zinc hydroxide, etc.

The halides used may be chlorides or bromides. If desired, there may be added an iodide, such as potassium iodide, which serves as a catalyst in promoting the reaction, undoubtedly through the formation of intermediate organic iodides. The use of a catalyst is not, however, essential as the presence of a double bond in these halides renders halogen labile. The halides which have been found particularly valuable include allyl, methallyl, crotyl, and cinnamyl. These all have in common the structure

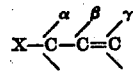

wherein X is a halogen.

Typical of the method involved and the products obtained are the following examples:

Example 1

42.9 g. of thioammeline are dissolved in a warm solution of 13.2 g. of sodium hydroxide, and 300 cc. of water. To the clear solution there is added, while the reaction mixture is stirred and cooled, 23 g. of allyl chloride. After the initial heat of reaction has moderated, the mixture is further stirred and heated at 50–60° C. for three and one-half hours. The crystalline product which forms is filtered off, washed and dried. The compound crystallizes from a large volume of boiling water in long, fine needles, melting at 152° C. The yield is about 70% of theory. Its analysis corresponds to the formula

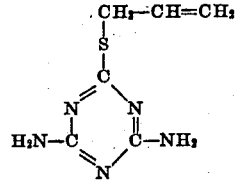

Example 2

To a clear solution of 42.9 g. of thioammeline, 13.2 g. of sodium hydroxide, and 300 cc. of water there is added 27.3 g. of methallyl chloride, $(CH_2=C(CH_3)CH_2Cl)$. The solution is stirred and boiled under reflux for six hours. The methallyl thioether of ammeline

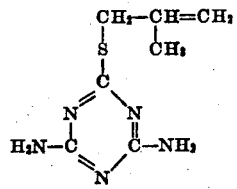

separates as a white powder which can be recrystallized from water, benzene, or aqueous alcohol. It separates from hot water in long, glistening needles, M. P. 130–131° C.

The products which are obtained according to the above procedures are of the general type

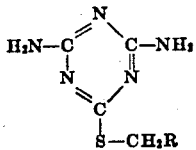

wherein R represents a monovalent hydrocarbon radical of at least two carbon atoms, in which the carbon atom attached to the methylene group is bound to an adjacent carbon atom by a double bond.

These thioammeline ethers are useful as bactericides, insecticides, vulcanization accelerators, corrosion inhibitors, pickling inhibitors, etc. The presence of the double bond seems to impart good insecticidal activity to these ethers. For example, tests of the methallyl thioammeline ether in a dust at 1% concentration gave 100% control of Mexican bean beetle larvae with 60% killed and 40% incapacitated. Experiments with magnesium arsenate gave a 60% control with 20% incapacitated and 40% killed. There was no injury to the plant and feeding of the larvae was at a minimum. The other members of this group of new thioammeline ethers are also effective against various plants pests, particularly in dusts, and are apparently free from any marked phytocidal action.

It has been found that the thioammeline ethers herein described react with formaldehyde to give interesting and valuable resins. They may also be reacted with an aldehyde in conjunction with carbamides such as urea, thiourea, dicyandiamide, melamine, etc. The resins obtained are particularly water-resistant and give a further reaction in hardening which appears to be a result of the unsaturated groups. The hardened resins possess a greater degree of thermoplasticity than the usual carbamide-aldehyde resins and this, too, appears to be due to the double bond in the structure of the base material. The resins obtained are useful in molding, laminating, gluing, impregnating, etc.

I claim:

1. A 4,6-diamino-1,3,5-triazine having in the 2-position a thioether group of at least three carbon atoms in an open chain, possessing a double bond in the $\beta,\gamma$-position.

2. 2-Allylmercapto-4,6-diamino-1,3,5-triazine.

3. 2 - Methallylmercapto - 4,6 - diamino-1,3,5-triazine.

HERMAN A. BRUSON.